United States Patent [19]

Tafoya et al.

[11] Patent Number: 5,426,963
[45] Date of Patent: Jun. 27, 1995

[54] SPARE TIRE ACCESS HOLE LOCK

[76] Inventors: Ignacio Tafoya; Helen E. Tafoya, both of 712 Elko Ave., Grants, N. Mex. 87020

[21] Appl. No.: 57,511

[22] Filed: May 6, 1993

[51] Int. Cl.6 .............................................. E05B 65/12
[52] U.S. Cl. ...................................... 70/259; 70/416; 224/42.21
[58] Field of Search ................... 70/2, 5, 13, 32-34, 70/258, 259, 416, 417, 423, 424, 455; 224/42.06, 42.12, 42.21, 42.23, 42.25, 42.41

[56] References Cited

U.S. PATENT DOCUMENTS

| | | | |
|---|---|---|---|
| 3,922,893 | 12/1975 | Berg | 70/13 |
| 3,940,959 | 3/1976 | Anderson et al. | 70/259 |
| 4,076,158 | 2/1978 | Barr | 70/259 X |
| 4,308,733 | 1/1982 | Tampa | 70/259 |
| 4,358,941 | 11/1982 | Zimmer | 70/32 X |
| 4,418,550 | 12/1983 | Hamilton | 70/2 X |
| 4,751,831 | 6/1988 | Morris, Jr. | 70/34 X |
| 4,751,833 | 6/1988 | Stumpf | 70/259 |
| 4,848,113 | 7/1989 | Parks | 70/259 |
| 4,869,084 | 9/1989 | Mack, Jr. | 70/259 |
| 4,873,851 | 10/1989 | Arnett | 70/259 |
| 5,102,022 | 4/1992 | Knezovich | 70/259 X |
| 5,199,287 | 4/1993 | McClary | 70/259 |
| 5,211,043 | 5/1993 | Langdon | 70/259 |
| 5,343,722 | 9/1994 | Richardson | 70/259 |

FOREIGN PATENT DOCUMENTS

| | | | |
|---|---|---|---|
| 265943 | 9/1927 | United Kingdom | 70/259 |
| 8301645 | 5/1983 | WIPO | 70/2 |

Primary Examiner—Peter M. Cuomo
Assistant Examiner—Suzanne L. Dino

[57] ABSTRACT

A spare tire access hole lock for preventing the theft of spare tires on vehicles equipped with undercarriage mounted spare tires. The spare tire access hole lock is particularly suited for use on trucks that are equipped with an access hole in the bumper for facilitating the insertion of a tool necessary to release the spare tire from stowage. The spare tire access hole lock prevents entrance of a tool to release the spare tire from stowage by obstructing access to the spare tire release mechanism through the spare tire access hole. The spare tire access hole lock may be used by inserting it through the spare tire access hole and securing it with a standard padlock to prevent its removal.

7 Claims, 4 Drawing Sheets

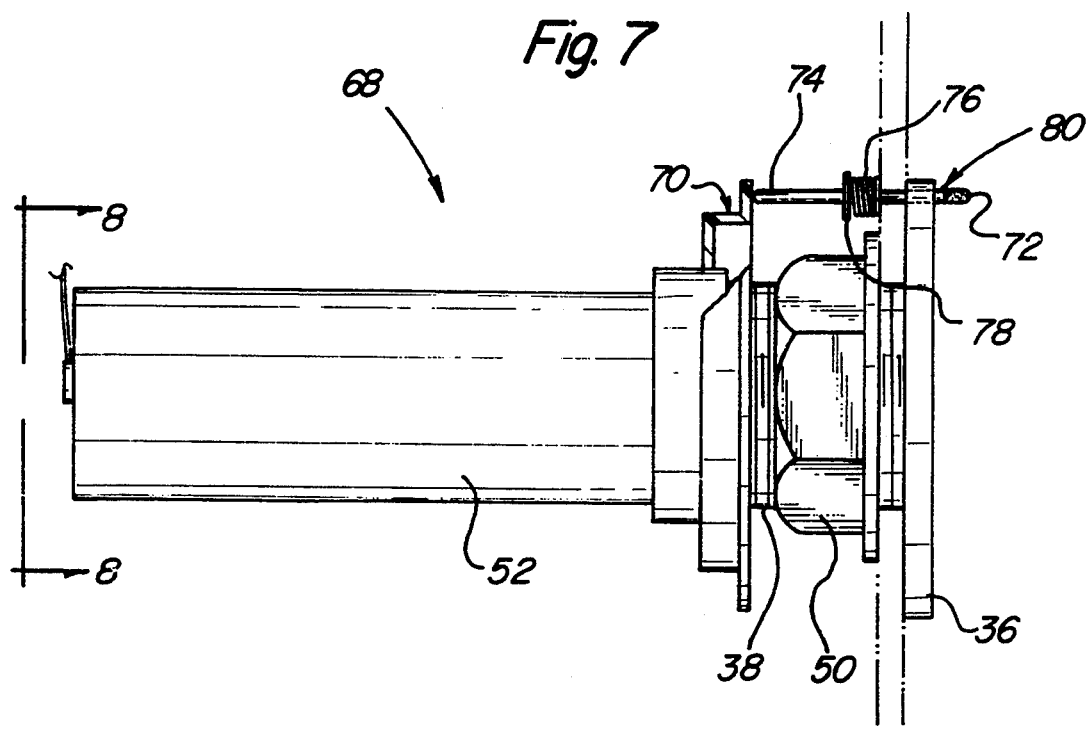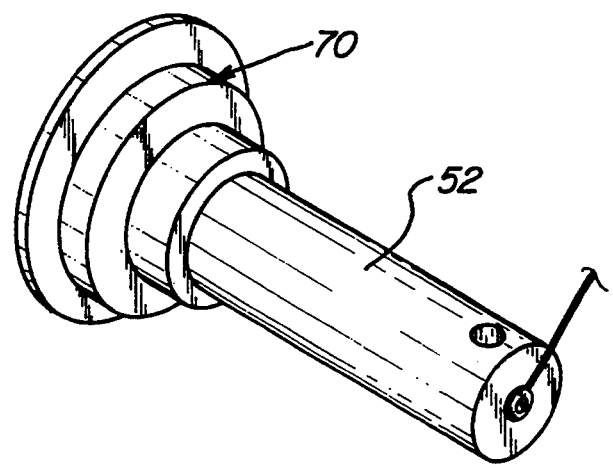

SPARE TIRE ACCESS HOLE LOCK

BACKGROUND OF THE INVENTION

1. Field of the Invention

The present invention relates to locks and more particularly pertains to spare tire access hole locks which may be used for preventing the theft of spare tires on vehicles equipped with undercarriage spare tires.

2. Description of the Prior Art

The use of spare tire locks is known in the prior art. More specifically, spare tire locks heretofore devised and utilized for the purpose of locking spare tires are known to consist basically of familiar, expected and obvious structural configurations, notwithstanding the myriad of designs encompassed by the crowded prior art which have been developed for the fulfillment of countless objectives and requirements.

A spare tire lock can be seen in U.S. Pat. No. 3,431,756, which issued to Fennell, that is attachable to the underside of tractor trailers for preventing theft of a spare tire captured therein.

Another example of a spare tire lock can be seen in U.S. Pat. No. 5,060,912, which issued to Guarr, that comprises a flexible drive tube for insertion through the bumper access hole of such equipped vehicles that further includes a keyed engagement for coupling to the spare tire release mechanism.

The most common method of preventing theft of a spare tire has been the use of a chain and padlock in a manner tethering the spare tire to the vehicle. While this prevents theft of a spare tire by a thief not having tools, such attempt at preventing theft of the spare tire is easily negated by the use of a simple hand tool such as a bolt cutter which can be used to quickly cut through the chain. Furthermore, the chain rattles during vehicle travel which is annoying to the vehicle occupants.

The locking mechanisms previously mentioned do not block the spare tire access hole in the bumper of a vehicle to preclude theft of the associated spare tire. In addition, the patents described above do not provide a simple and effective accessory locking device that may be used without drilling or modifying the associated vehicle.

In this respect, the spare tire access hole lock according to the present invention substantially departs from the conventional concepts and designs of the prior art, and in so doing provides an apparatus primarily developed for the purpose of preventing entrance of a tool to release the spare tire from stowage by obstructing access to the spare tire release mechanism through the spare tire access hole.

Therefore, it can be appreciated that there exists a continuing need for new spare tire access hole locks which can be utilized for preventing the theft of spare tires on vehicles equipped with undercarriage mounted spare tires by obstructing access to the spare tire release mechanism through the spare tire access hole. In this regard, the present invention substantially fulfills this need.

SUMMARY OF THE INVENTION

In view of the foregoing disadvantages inherent in the known types of spare tire locks now present in the prior art, the present invention provides a new spare tire access hole lock construction wherein the same can be utilized for preventing entrance of a tool to release a spare tire from stowage by obstructing access to the spare tire release mechanism through the spare tire access hole. As such, the general purpose of the present invention, which will be described subsequently in greater detail, is to provide a new spare tire access hole lock apparatus and method which has many of the advantages of the spare tire locks mentioned heretofore and many novel features that result in a spare tire access hole lock that is neither anticipated, rendered obvious, suggested, or even implied by any of the prior art, either alone or in any combination thereof.

To attain this, the present invention essentially comprises a spare tire access hole lock for preventing the theft of spare tires on vehicles equipped with undercarriage spare tires. The spare tire access hole lock is particularly suited for use on trucks that are equipped with an access hole in the bumper for facilitating the insertion of a tool necessary to release the spare tire from stowage. The spare tire access hole lock prevents entrance of a tool to release the spare tire from stowage by obstructing access to the spare tire release mechanism through the spare tire access hole. The invention is essentially comprised of a cover plate, a joiner, and a lock plate that may be fastened together. The device may be used by inserting it through the spare tire access hole and securing it with a standard padlock to preclude its removal, thereby preventing unauthorized release of the spare tire by the use of a tool inserted through the spare tire access hole.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new spare tire access hole lock apparatus and method which has many of the advantages of the spare tire locks mentioned heretofore and many novel features that result in a spare tire access hole lock that is neither anticipated, rendered obvious, suggested, or even implied by any of the prior art, either alone or in any combination thereof.

It is another object of the present invention to provide a new spare tire access hole lock which may be easily and efficiently manufactured and marketed.

It is a further object of the present invention to provide a new spare tire access hole lock which is of a durable and reliable construction.

An even further object of the present invention is to provide a new spare tire access hole lock which is susceptible of a low cost of manufacture with regard to both materials and labor, and which accordingly is then susceptible of low prices of sale to the consuming public, thereby making such spare tire access hole locks economically available to the buying public.

Still yet another object of the present invention is to provide a new spare tire access hole lock which provides in the apparatuses and methods of the prior art some of the advantages thereof, while simultaneously overcoming some of the disadvantages normally associated therewith.

Still another object of the present invention is to provide a new spare tire access hole lock for vehicles which diminishes the possibility of spare tire theft.

Yet another object of the present invention is to provide a new spare tire access hole lock which eliminates the need to use chains in order to secure the spare tire for preventing theft of the spare tire.

Even still another object of the present invention is to provide a new spare tire access hole lock which prevents entrance of the tool necessary to release the spare tire from stowage by obstructing access to the spare tire release mechanism through the spare tire access hole.

Even still yet another object of the present invention is to provide a new spare tire access hole lock which is easily installable without drilling or modifying the associated vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a side elevation view of a further embodiment of the present invention.

FIG. 8 is a partial perspective view of a further embodiment of the present invention as viewed from line 8—8 of FIG. 7.

DESCRIPTION OF THE PREFERRED EMBODIMENTS

Figure 1:
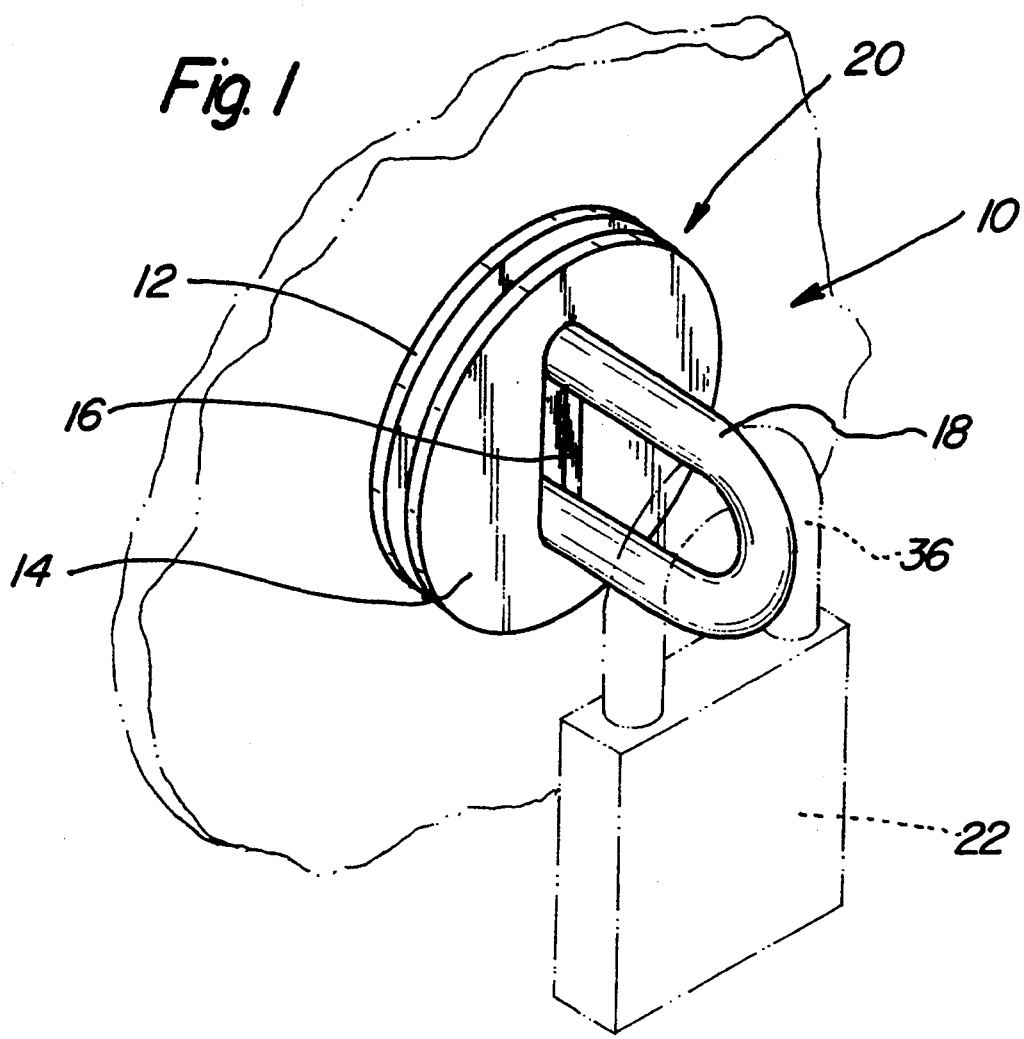
FIG. 1 is a perspective view of a spare tire access hole lock comprising the present invention as installed through an access hole and secured with a padlock.
Figure 2:
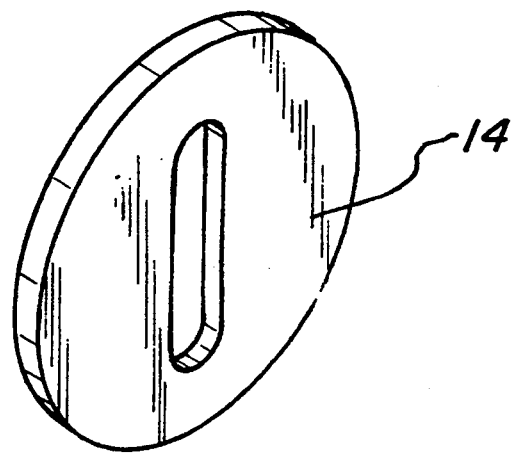
FIG. 2 is a perspective view of a lock plate comprising a portion of the present invention.

With reference now to the drawings, and in particular to FIGS. 1 and 2 thereof, a first embodiment of a new spare tire access hole lock embodying the principles and concepts of the present invention and generally designated by the reference numeral 10 will be described.

More specifically, it will be noted that the spare tire access hole lock 10 of the present invention includes a cover plate 12 made from any suitable theft resistant material that is substantially flat and may be of any size necessary to facilitate coverage of a spare tire access hole (not shown) on a vehicle equipped with such a spare tire access hole. A lock plate 14 is formed in substantially the same shape and size as the cover plate 12 while being further formed in such a manner as to define an elongated oval-shaped aperture 16 of sufficient size to allow a substantially u-shaped joiner 18 to pass through the aperture. The cover plate 12 is connected to the joiner 18 so that the cover plate and joiner assembly 20 may be inserted through the spare tire access hole (not shown) whereby the lock plate 14 may be placed over the joiner and secured with a standard padlock 22 in a well understood manner.

Figure 3:
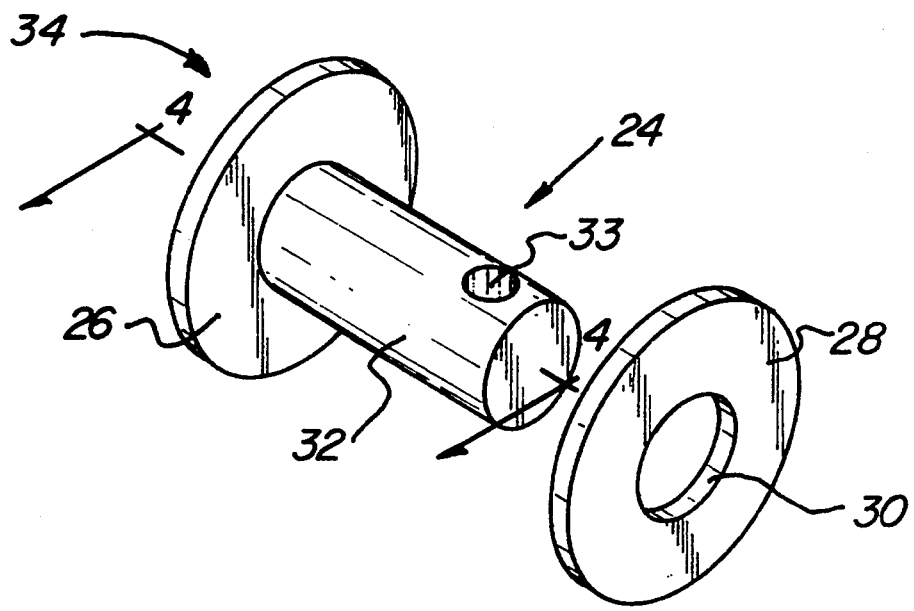
FIG. 3 is a perspective view of a second embodiment of the invention.
Figure 4:
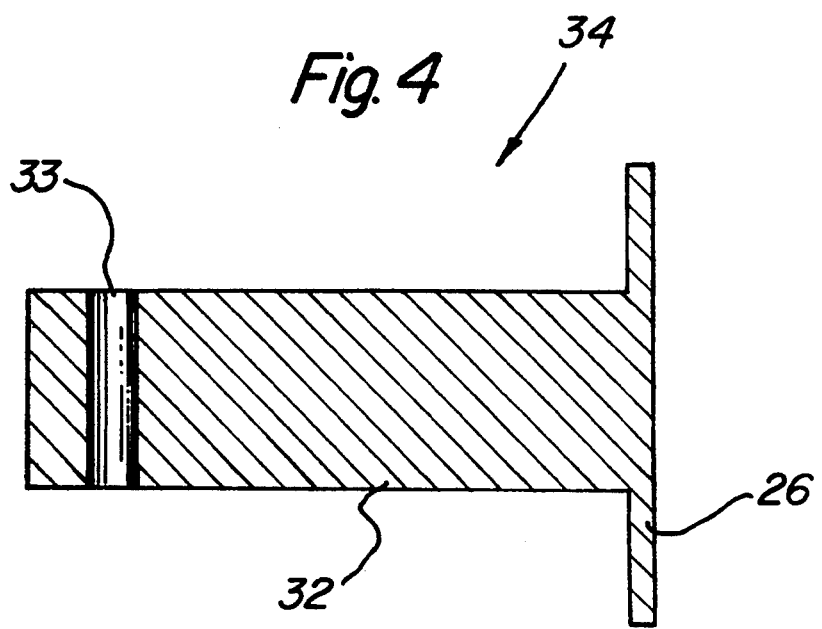
FIG. 4 is a cross sectional view taken along line 4—4 of FIG. 3.

Referring now to FIG. 1 in conjunction with FIGS. 3 and 4, a second embodiment 24 of the invention includes a cover plate 26 that is substantially flat and may be of any size necessary to facilitate coverage of a spare tire access hole (not shown) on a vehicle equipped with such a spare tire access hole. A lock plate 28 is formed in substantially the same shape and size as the cover plate 26 while being further formed in such a manner as to define an aperture 30 of sufficient size to allow a substantially cylindrically shaped joiner 32 to pass through the aperture. The joiner 32 is integrally or otherwise fixedly secured to the cover plate 26 so as to define a joiner assembly 34. The joiner 32 is further formed in such a manner as to include an opening 33 of proper size and shape so as to allow passage of a standard lock shackle 36 therethrough. In use, the joiner assembly 34 may be inserted through the spare tire access hole (not shown) whereby the lock plate 28 may be placed over the joiner 32 and secured with a standard padlock 22.

Figure 5:
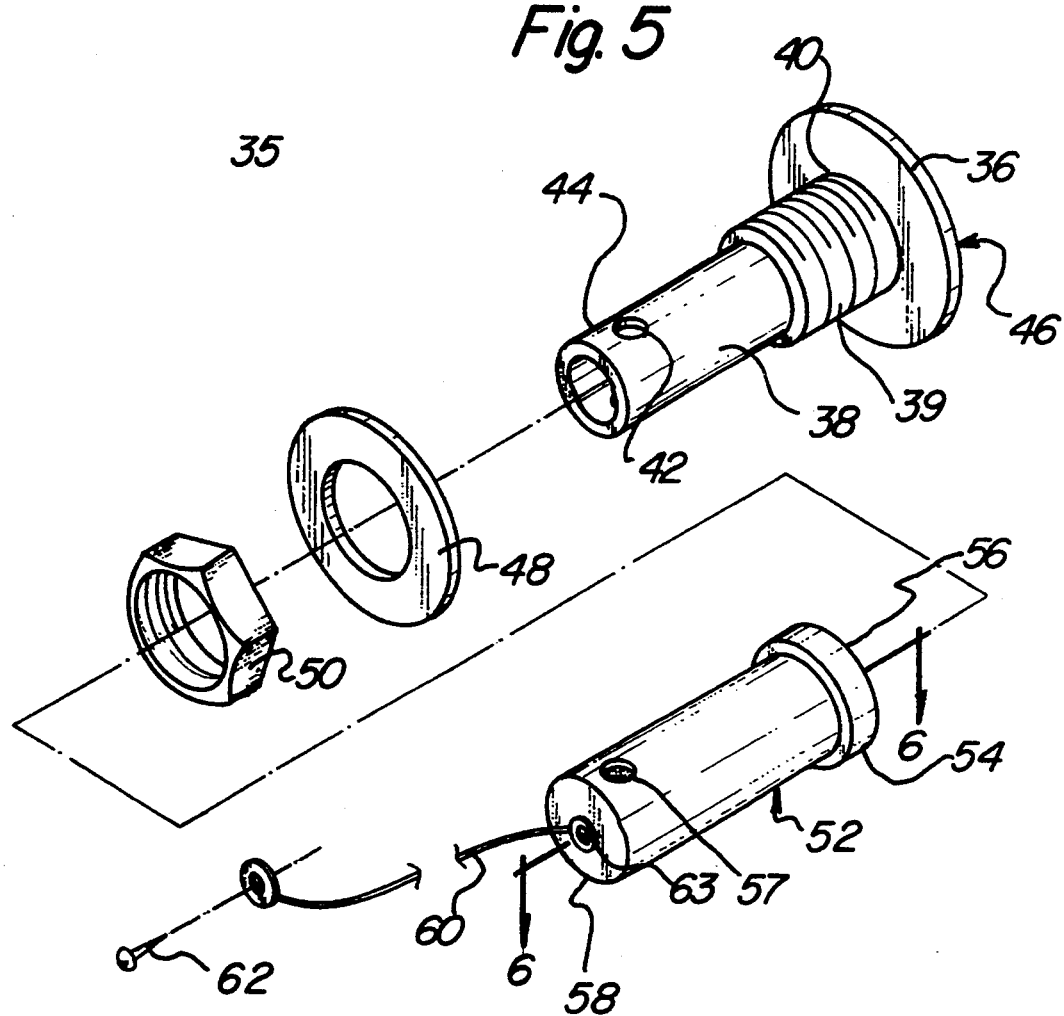
FIG. 5 is an exploded perspective view of a spare tire access hole lock comprising the present invention.
Figure 6:
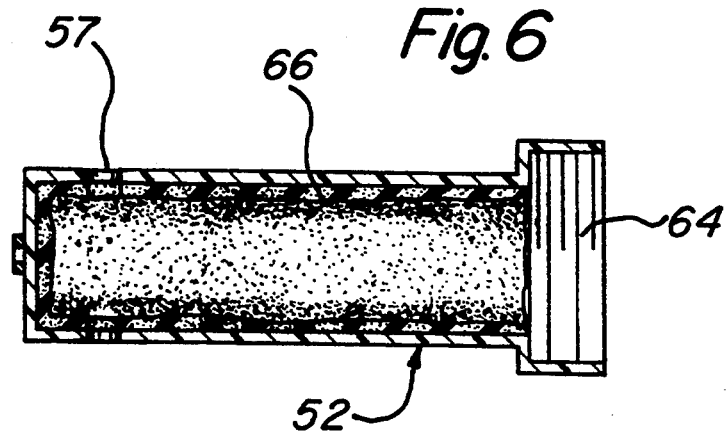
FIG. 6 is a cross sectional view taken along line 6—6 of FIG. 5.

A further embodiment of the present invention may be seen in FIGS. 5-6. With concurrent reference to FIG. 1, the further embodiment of the present invention generally designated by reference numeral 35 includes a cover plate 36 that is substantially flat and may be of any size necessary to facilitate coverage of a spare tire access hole (not shown). Coupled to the cover plate 36 is a joiner tube 38 that is substantially hollow and has threads 39 present at a first end 40 near the cover plate. The joiner tube 38 is further formed in such a manner so as to include an opening 42 at a second end 44, such opening passing through both walls of the joiner tube to facilitate the passage of the lock shackle 36 of a standard padlock 22. The cover plate and joiner tube assembly 46 may be inserted through a spare tire access hole (not shown) and secured to the perimeter of the access hole by a washer 48 and a nut 50 that are rotatably engaged to the threads 39 present on the joiner tube 38. A protective cap 52 comprised of any suitable material is cylindrical in shape and formed in such a manner so as to define both a flange 54 at a first end 56 and an opening 57 at a second end 58, such opening being of appropriate size to allow passage of the lock shackle 36 of a standard padlock 22. The protective cap 52 may be tethered to a vehicle by a tether 60 and securing fasteners 62, 63. Furthermore, the protective cap 52 is provided with internal threads 64 suitable for engagement with the threads 39 present on the joiner tube 38 in a well understood manner. The protective cap 52 may further include a foam liner 66 to retain oil for application to the joiner tube 38.

An even further embodiment of the present invention, which is generally designated by reference numeral 68, can be seen in FIGS. 7-8. This further embodiment 68 includes all of the features of the foregoing embodiment 35 and further comprises an additional flange 70 that is fixedly secured to the protective cap 52. A button 72 is connected to a plunger 74, such plunger being coupled to a spring 76 that engages a flange 78 of the plunger to form a plunger assembly 80. The plunger assembly 80 is slidably mounted to the cover plate 36 so that the protective cap 52, when placed upon the joiner tube 38, will engage the plunger 74 to bias the button 72 into a visible position in a well understood manner, whereby a user may readily see that the protective cap is present upon the joiner tube.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A spare tire access hole lock and a vehicle bumper in combination comprising:

a bumper having a planar area with a circular spare tire access hole extending through said planar area of said bumper, said planar area having a front surface parallel to a rear surface, said front surface being in contiguous communication with said rear surface, with said front surface being spaced from said rear surface a first distance;

a cover plate, said cover plate comprising a substantially flat planar member, said cover plate having a front face and a rear face, said rear face of said cover plate being positioned in an abutting relationship with said front surface of said planar area of said bumper;

and, a joiner having a proximal end and a distal end, said joiner being orthogonally coupled at said proximal end of said joiner to said rear face of said cover plate so as to project through said spare tire access hole of said bumper, said joiner comprising a cylindrical member having a constant circular cross sectional dimension and being positioned through said spare tire access hole in said planar area of said bumper such that said cover plate is positioned flatly against said planar area of said bumper, said joiner having a longitudinal axis, with an opening formed in said distal end of said joiner and extending orthogonal relative to said longitudinal axis thereof, said opening comprising a straight bore operable to receive a shackle of a lock therethrough to permit securing of said spare tire access hole lock to said bumper, an outer peripheral edge of said opening being spaced from said rear face of said cover plate said first distance such that said shackle of said lock can be positioned through said opening to abuttingly engage said rear surface of said bumper.

2. A spare tire access hole lock and a vehicle bumper in combination comprising a bumper having a planar area with a circular spare tire access hole extending through said planar area of said bumper, said planar area having a front surface parallel to a rear surface, said front surface being in contiguous communication with said rear surface, with said front surface being spaced from said rear surface a first distance;

a cover plate, said cover plate comprising a substantially flat planar member, said cover plate having a front face and a rear face, said rear face of said cover plate being positioned in an abutting relationship with said front surface of said planar area of said bumper;

a lock plate, said lock plate being substantially planar in shape and having a lock plate aperture extending therethrough, said lock plate being positioned into an abutting relationship with said rear surface of said planar area of said bumper, said lock plate having a thickness of a second distance;

and, a joiner having a proximal end and a distal end, said joiner being orthogonally coupled at said proximal end of said joiner to said rear face of said cover plate so as to project through said spare tire access hole of said bumper and through said lock plate aperture of said lock plate, said joiner comprising a cylindrical member having a constant circular cross sectional dimension and being positioned through said spare tire access hole in said planar area of said bumper such that said cover plate is positioned flatly against said planar area of said bumper, said joiner having longitudinal axis, with an opening formed in said distal end of said joiner and extending orthogonal relative to said longitudinal axis thereof, said opening comprising a straight bore operable to receive a shackle of a lock therethrough to permit securing of said spare tire access hole lock to said bumper, an outer peripheral edge of said opening being spaced from said rear face of said cover plate a sum of said first distance and said second distance such that said shackle of said lock can be positioned through said opening to abuttingly engage said lock plate to maintain the lock plate in abutting engagement with said rear surface of said bumper.

3. A spare tire access hole lock for use with a bumper having a planar area with a spare tire access hole extending through said planar area of said bumper, said spare tire access hole lock comprising:

a cover plate, said cover plate comprising a substantially flat planar member, said cover plate having a front face and a rear face;

a joiner having a proximal end and a distal end, said joiner being orthogonally coupled at said proximal end of said joiner to said rear face of said cover plate, said joiner comprising a cylindrical member having a circular cross section and being positionable through said spare tire access hole formed in said planar area of said bumper such that said cover plate is positioned flatly against said planar area of said bumper, said joiner having a longitudinal axis, with an opening formed in said distal end of said joiner and extending orthogonal relative to said longitudinal axis thereof, said opening comprising a straight bore operable to receive a shackle of a lock therethrough to permit securing of said spare tire access hole lock to said bumper, said joiner including an exterior surface with threads being formed about said exterior surface, said joiner being substantially hollow so as to allow a passage of a spare tire access tool therethrough;

a lock plate, said lock plate being substantially planar in shape and having a lock plate aperture extending therethrough, said lock plate being positioned over said distal end of said joiner prior to a passing of said shackle through said opening such that said lock plate is interposed between said shackle and said bumper;

and, a nut threadably engagable to said threads on said exterior surface of said joiner so as to capture said bumper and said lock plate between said nut and said cover plate.

4. The spare tire access hole lock as recited in claim 3, and further comprising a protective cap, said protective cap being substantially cylindrical in shape and having a hollow interior, said protective cap including interior threads engagable to said threads formed on said exterior surface of said joiner so as to removably couple said protective cap over said joiner.

5. The spare tire access hole lock as recited in claim 4, and further comprising a tether having first and second ends with said first end of said tether being coupled to said protective cap and said second end thereof being couplable to said bumper.

6. The spare tire access hole lock as recited in claim 5, and further comprising a foam liner coupled to an interior surface of said protective cap, said foam liner being coextensive with said interior surface and being operable to retain oil for application to said joiner.

7. The spare tire access hole lock as recited in claim 6, wherein said protective cap includes a flange extending therearound; and further comprising a plunger assembly movably mounted to said cover plate, said plunger assembly having an inner end and an outer end, with a button mounted to said outer end of said plunger assembly, whereby a positioning of said protective cap onto said joiner will cause said flange to engage said inner end of said plunger assembly to bias said button relative to said cover plate.

* * * * *